June 3, 1947.  A. A. NEW ET AL  2,421,640
ELECTRIC INSULATING TAPE
Filed Sept. 16, 1942
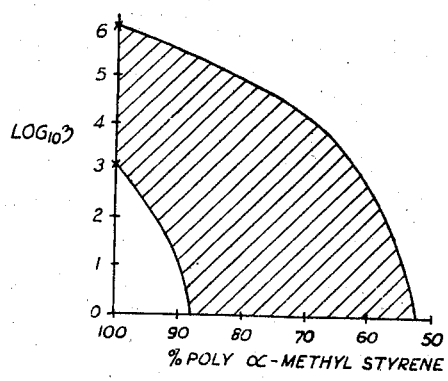
INVENTOR.
A A New
S G Foord
D R Beckwith
BY
D G Angus
ATTORNEY Patented June 3, 1947

2,421,640

UNITED STATES PATENT OFFICE 2,421,640

ELECTRIC INSULATING TAPE

Archibald Alan New, Stanley George Foord, and Dudley Robert Beckwith, London W. C. 2, England, assignors to International Standard Electric Corporation, New York, N. Y.

Application September 16, 1942, Serial No. 458,599
In Great Britain November 28, 1941

3 Claims. (Cl. 117—122)

This invention relates to elastic insulating materials and more particularly to sticky tapes used for electrical insulating purposes.

The well known sticky tapes used for electrical insulation, made with a cotton fabric base and compounds comprising rubber, rubber resin, bitumens, waxes, rosin, vegetable oils &c. do not have particularly good electrical properties, especially under very humid conditions and/or at high frequencies such as are used for radio communication. Their widespread use is based mainly on their convenience combined with moderate electrical properties and they suffer from what, in some circumstances, is a defect in that when exposed to the air they oxidise and lose their tackiness so that if it is desired periodically to open up and examine a repair or joint made with them, it may be necessary to use a fresh piece of tape each time the repair or joint is resealed.

According to the present invention we provide a tape for electric insulating purposes which consists of a fibrous base impregnated or coated with a liquid having a viscosity between $10^3$ and $10^6$ poises at 20° C. and comprising polymerised styrene or substituted styrene.

In one embodiment, a fibrous tape is impregnated with polymerised alpha methyl styrene having a viscosity of between $10^3$ and $10^6$ poises at a temperature of 20° C.

Polymerised alpha methyl styrene is sold commercially in the form of a liquid, the viscosity of which may vary considerably, owing mainly to the presence of polymers of different molecular weights. Not all these polymers are, however, suitable for the production of sticky insulating tapes. We have found that if the viscosity is below $10^3$ poises at 20° C. an impregnated tape does not exhibit sufficient adhesion to form a satisfactory sticky tape at room temperature. Moreover if the viscosity is above $10^6$ poises at 20° C. impregnation of the fibrous base is difficult, and is apt to be incomplete, adhesion is slow and unwinding from a roll (that has been wound for some time) is difficult.

Impregnation of a fibrous type with polymerised alpha methyl styrene of viscosity between $10^3$ and $10^6$ poises is readily carried out because the polymerised material has a very steep viscosity-temperature curve.

In another embodiment of the invention a fibrous tape is impregnated with a mixture of polystyrene and polymerised alpha methyl styrene, the latter having a viscosity between 200 centipoises and $10^6$ poises at 20° C. The viscosity of the mixture should be between $10^3$ and $10^6$ poises at 20° C. and the drawing shows a graph by means of which the proportions of polystyrene and polymerised alpha methyl styrene may be determined.

Ordinates represent logarithms to base 10 of the viscosity of polymerised alpha methyl styrene in poises and abscissae represent percentages of polymerised alpha methyl styrene. A mixture containing a percentage of polymerised alpha methyl styrene represented by a given abscissa will be satisfactory if the point corresponding to that abscissa and an ordinate representing the logarithm of the viscosity of this polymerised alpha methyl styrene falls within the shaded area.

Liquids suitable for impregnating or coating tapes in accordance with this invention may also be formed from polystyrene and other plasticisers. The percentage composition varies with the viscosity of the plasticiser used. For example a lower molecular weight polymerised alpha methyl styrene having a viscosity of 30 centipoises at 20° C. may be used in proportions from 50% to 90% by weight. Other suitable plasticisers have been described in Patent No. 2,272,996 and British application No. 8937/41. As an example of a mixture formed with a plasticiser according to Patent No. 2,272,996, mixtures of polystyrene and alphaisoamylnaphthalene containing between 55% and 75% by weight of the latter may be used. Mixtures containing 50% and 80% are however unsuitable. As examples of the use of plasticisers according to British application No. 8937/41 may be mentioned mixtures of polystyrene with 50% and 60% respectively of diphenyl methane, which have been found suitable for the purposes of the present invention whilst mixtures of polystyrene with 40% and 70% of diphenyl methane have been found to be unsuitable.

The above examples of mixtures containing polystyrene refer to mixtures with polystyrene of molecular weights 80,000 (as determined by the Staudinger method) but may be taken to be equally applicable if the molecular weight varies between 30,000 and 300,000. Suitable mixtures may however be made by using polystyrene of much lower molecular weight, the proportions being correspondingly varied. As examples may be mentioned mixtures of polystyrene of molecular weight 3,000 and a diphenylbutane on the one hand, and 1.1'-p-tolylethane on the other hand. Thus mixtures of 80% polystyrene of molecular weight 3000 with 20% of 1.4 diphenylbutane, or with 20% of 1.1' di-p-tolylethane have been found suitable for use in the present invention. Also mixtures of 50% and 40% of polystyrene of molecular weight 80,000 wtih 50% and 60% respectively of 1.1' di-p-tolylethane have yielded useful sticky tapes.

All the above mentioned tapes can conveniently be made by direct impregnation of the fibrous base in pad or roll form preferably at elevated temperatures. In the case of the mixtures containing polystyrene and the lower limit of plasticiser it is more convenient to roll or friction the compound into the fibrous base by the use of pressure on heated rollers.

Insulating tapes according to this invention have all the convenience of application of the well known kinds but retain their stickiness for very much longer periods and have better electrical properties. They can also be made of any desired colour instead of the usual black shade.

The fibrous base may be paper, cotton, wool or silk. If this base is of cellulosic material it may be partially or wholly esterified as described in U. S. Patent 2,092,477, British Patent 395,737 or U. S. Patent 2,253,724 or if of wool or silk may be treated as described in British Patent No. 449,955.

What is claimed is:

1. An insulating tape permanently sticky at room temperature comprising a body impregnated with polymerized alpha methyl styrene having a viscosity between $10^3$ and $10^6$ poises at 20° C.

2. An insulating tape permanently sticky at room temperature comprising a body impregnated with a mixture of polymerized alpha methyl styrene havig a viscosity between 200 centipoises and $10^6$ poises at 20° C., and polymerized styrene having a molecular weight between 30,000 and 300,000, said mixture having a viscosity between $10^3$ and $10^6$ poises at 20° C.

3. An insulating tape permanently sticky at room temperature, comprising a body impregnated with a mixture of 50% to 90% polymerized alpha methyl styrene having a viscosity between 200 centipoises and $10^6$ poises at 20° C., and 50% to 10% polymerized styrene having a molecular weight between 30,000 and 300,000, said mixture having a viscosity between $10^3$ and $10^6$ poises at 20° C.

ARCHIBALD ALAN NEW.
STANLEY GEORGE FOORD.
DUDLEY ROBERT BECKWITH.

REFERENCES CITED

The following references are of record in the file of this patent:

UNITED STATES PATENTS

| Number | Name | Date |
| --- | --- | --- |
| 2,213,423 | Wiezevich-Gaylor | Sept. 3, 1940 |
| 2,272,996 | Warner et al. | Feb. 10, 1942 |
| 2,103,841 | Calvert | Dec. 28, 1937 |
| 2,285,570 | Cummins et al. | June 9, 1942 |
| 2,249,987 | Stanley et al | July 22, 1941 |
| 2,365,646 | New | Dec. 19, 1944 |

FOREIGN PATENTS

| Number | Country | Date |
| --- | --- | --- |
| 345,939 | Great Britain | 1931 |
| 454,923 | Great Britain | Oct. 8, 1936 |
| 506,290 | Great Britain | Dec. 24, 1937 |